(12) United States Patent
Saravis

(10) Patent No.: US 12,531,589 B2
(45) Date of Patent: Jan. 20, 2026

(54) TEMPERATURE REGULATING CASE

(71) Applicant: Darren Saravis, Long Beach, CA (US)

(72) Inventor: Darren Saravis, Long Beach, CA (US)

( * ) Notice: Subject to any disclaimer, the term of this patent is extended or adjusted under 35 U.S.C. 154(b) by 463 days.

(21) Appl. No.: 17/873,076

(22) Filed: Jul. 25, 2022

(65) Prior Publication Data

US 2023/0039351 A1 Feb. 9, 2023

Related U.S. Application Data

(60) Provisional application No. 63/287,964, filed on Dec. 9, 2021, provisional application No. 63/224,864, filed on Jul. 23, 2021.

(51) Int. Cl.
*H04B 1/3888* (2015.01)
*H05B 3/06* (2006.01)

(52) U.S. Cl.
CPC .............. *H04B 1/3888* (2013.01); *H05B 3/06* (2013.01)

(58) Field of Classification Search
CPC ........... G06F 1/1626; G06F 2200/1633; G06F 1/1656; G06F 1/1628; G06F 1/181; G06F 1/163; G06F 1/1635; G06F 1/206; H02J 7/0044; H02J 7/342; H04M 1/0262; H04M 1/04; H04M 1/0254; H04M 1/0279; H05K 5/03; H04B 1/3888; H05B 3/06; H05B 1/023; H05B 3/34; H05B 1/02; F16M 13/00; F16M 11/041; F16M 13/022; A45C 13/10; A45C 13/30; A45C 2013/1015; Y10T 24/32; Y10T 24/39; Y10T 24/3987
See application file for complete search history.

(56) References Cited

U.S. PATENT DOCUMENTS

| | | | |
|---|---|---|---|
| 2012/0311357 A1 | 12/2012 | Andrews | |
| 2014/0293536 A1* | 10/2014 | Bramah | G06F 1/1632 |
| | | | 361/679.55 |
| 2015/0192477 A1 | 7/2015 | Sacchetti et al. | |
| 2016/0308569 A1 | 10/2016 | Wei | |
| 2019/0346893 A1* | 11/2019 | Dillow | G06F 1/1626 |
| 2019/0393568 A1* | 12/2019 | Lewis | H01M 10/425 |
| 2021/0116949 A1 | 4/2021 | Chen | |

FOREIGN PATENT DOCUMENTS

DE 102020003723 A1 8/2020

* cited by examiner

*Primary Examiner* — Quoc Thai N Vu
(74) *Attorney, Agent, or Firm* — Avyno Law P.C.

(57) ABSTRACT

A temperature regulating case is provided for engaging a portable electronic device. The temperature regulating case includes a housing for engaging a portable electronic device. The housing includes at least one heating element aligned with the back of the portable electronic device for heating the electronic device when used in cool temperatures.

10 Claims, 12 Drawing Sheets

TEMPERATURE REGULATING CASE

CROSS-REFERENCE TO RELATED APPLICATIONS

This application claims priority to U.S. Provisional Patent Application Ser. No. 63/224,864, filed Jul. 23, 2022, titled Temperature Regulating Heating Case and to U.S. Provisional Patent Application Ser. No. 63/287,964, filed Dec. 9, 2021, titled Temperature Regulating Case, both applications of which are incorporated into this application in their entirety.

FIELD OF THE INVENTION

The invention relates to a temperature regulating case for portable electronic devices, and in particular, a case that includes at least one heating element for maintaining a predetermined temperature within the temperature regulating case and/or of the electronic device which is housed in the case.

BACKGROUND OF THE INVENTION

Portable electronic devices, including tablets, such as iPADs, iPAD Airs and iPAD minis; smart phones, such as iPhones and Android phones; mobile phones; and personal computers, all of which are typically powered by a battery so that users may carry them about and use them as needed, including when working indoors and outdoors, and operating a vehicle, such as an aircraft, boat, truck, train or car. Frequently, these devices provide information to users, and for many, such a device has become a required tool for work, navigation, and general everyday use. Such devices are also used to process sales transactions, track inventory, perform data entry and for other commercial purposes, which requires the portable electronic device to be used consistently for long hours both indoors and outdoors.

When in use, it can become problematic if the electronic device is exposed to cold. The electronic device if it becomes too cold for long periods of time can shut down or stop working. Currently, if a device gets too cold, the user's only option is to get the device to a warmer environment and increase its internal temperature. For example, a device may be warmed by putting the device in the user's pocket. Once the device's internal temperature increases, it may automatically turn back on if not permanently damaged. Exposure of electronic devices to extreme cold can impact, for example, enterprise cold food producers, cold food transportation and storage workers, warehouse workers where temperatures can reach −18 F and/or tech ops for aviation at cold climate airports. A need exists for portable electronic devices to be used in cooler temperatures and for long-durations without interruption from exposure to extreme cold.

SUMMARY OF THE INVENTION

A temperature regulating case is provided for engaging a portable electronic device. The temperature regulating case includes a housing for engaging a portable electronic device and at least one heating element positioned in the housing in alignment with the back of the portable electronic device for heating the electronic device when used in cool temperatures. The heating element may be any number of different types of heating elements, for example, the heating element may be a flexible heating pad or in another example, a Peltier plate. The heating element may be in direct contact with the portable electronic device or positioned behind the electronic device with a thermal conductive plate or cover positioned between the heating element and the electronic device. The temperature regulating case may further include a temperature sensor positioned near or in contact with the back of the electronic device. Further, the temperature regulating case may include a proportional integral derivative ("PID") temperature controller in communication with the temperature sensor.

In another example, the temperature regulating case may include a top and bottom housing. The top housing is for covering the perimeter edges of the top of the portable electronic device, and includes an opening for the screen of the portable electronic device. The bottom housing includes a receptacle for receiving a portable electronic device. The bottom housing further includes at least one heating element, at least one battery, a power switch and a circuit board in communication with the at least one heating element, at least one battery and power switch. The at least one heating element is positioned in the bottom housing in alignment with the back of the portable electronic device for heating the electronic device when used in cool temperatures.

The heating element may be a flexible heating pad or a Peltier plate. The heating element may be positioned behind the portable electronic device opposing the screen and may be positioned in direct contact with a surface of the portable electronic device opposing the screen. The at least one heating element, at least one battery, power switch and circuit board may all be positioned below the portable electronic device when engaged with the temperature regulating case.

In yet another example of an implementation, the temperature regulating case includes a top housing and a bottom housing. The top housing covers the perimeter edges of the top of the portable electronic device and has an opening for the screen of the portable electronic device. The bottom housing includes at least one heating element and a temperature sensor positioned behind the portable electronic device. The bottom housing further includes at least one battery, a power switch and a circuit board in communication with the at least one heating element, at least one battery, power switch and temperature sensor. Like with other examples, the at least one heating element may be a flexible heating pad or in another example, a Peltier plate. The at least one heating element may be in direct contact with a surface of the portable electronic device opposing the screen. Further, the temperature sensor may also be in direct contact with a surface of the portable electronic device opposing the screen.

The temperature regulating case may further include a second temperature sensor for monitoring the ambient air temperature outside of the temperature regulating case. The second temperature sensor is in communication with the circuit board. The temperature regulating case may further include a PID temperature controller in communication with the first temperature sensor and/or second temperature sensor. Lastly, the temperature regulating case may further include an electrical cable in communication with the circuit board and the battery for connecting to the charge adapter of the electronic device to charge the portable electronic device while in the temperature regulating case.

Other devices, apparatus, systems, methods, features and advantages of the invention are or will become apparent to one with skill in the art upon examination of the following figures and detailed description. It is intended that all such additional systems, methods, features and advantages be included within this description, be within the scope of the invention, and be protected by the accompanying claims.

DESCRIPTION OF THE FIGURES

The invention may be better understood by referring to the following figures. The components in the figures are not necessarily to scale, emphasis instead being placed upon illustrating the principles of the invention.

DESCRIPTION OF THE INVENTION

Figure 1:
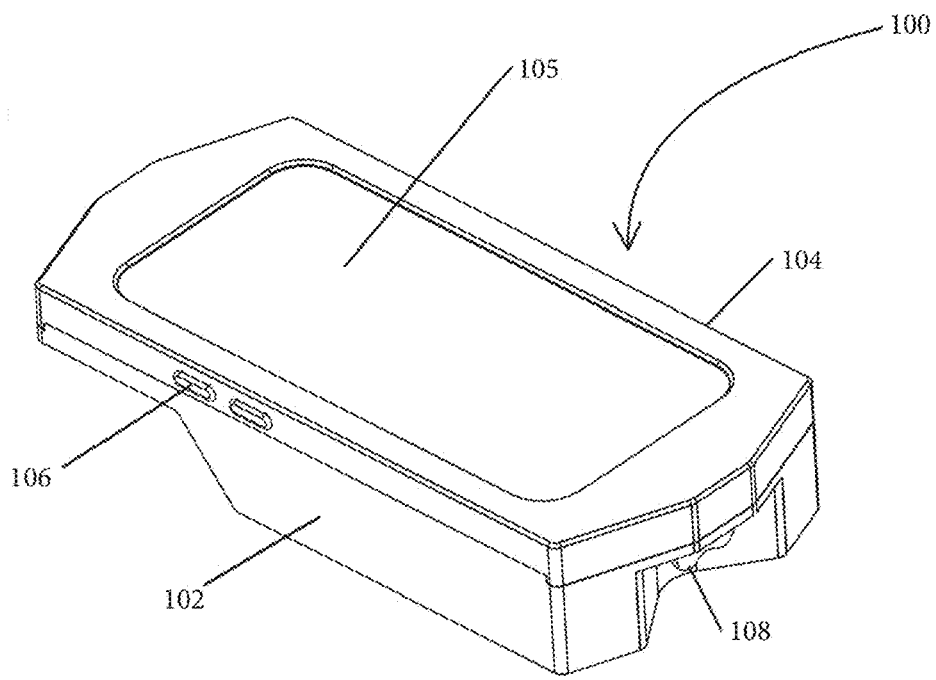
FIG. 1 is a perspective view of the top, right side of one example of an implementation of a temperature regulating case of the present invention as it appears engaged with an iPhone.

The current invention relates to a temperature regulating case for portable electronic devices, including, but not limited to, tablets, such as iPADs, iPAD Airs and iPAD minis; smart phones, such as iPhones and Android phones; cell phones; and personal computers (each an "electronic device") that will not only extend product life, but also prevent critical temperature shutdowns and general overcooling of the device. As illustrated and explained further below, in one example, the present invention is a heating case that provides for at least one heating element positioned within a case, such that the at least one heating element is aligned with the back of the electronic devices. In certain applications, the heating element may be one or more heating pads. The heating pads may be in the form of flexible film pad, heating plates or other know heating elements. In other examples, the heating elements may be Peltier plates, or other physical heating elements that generate heat through the process of Joule heating or the Peltier effect. Those skilled in the art will recognize that when a Peltier plate is used, temperature regulating case can both heat and cool the portable electronic device.

In one example, the temperature regulating case includes a bottom housing and top housing for receiving the electronic device where the electronic device is contained in the housing with the screen and buttons of the electronic device being accessible through the housing. In additional to the heating pad, the bottom housing includes a circuit board, such as a printed circuit board ("PCB") board or integrated circuit ("IC") that may include a microprocessor or controller, and batteries for providing electrical power to the heating pads and circuit board. A power button and power adapters are also provided. In one example, the top and bottom housing are removably attached and held together by a friction fit, screws and nuts, snaps, or other known mechanism for removably securing the top and bottom housing together.

The device may further include a temperature probe for regulating the temperature of the electronic device to determine when to turn the heat pads on and off. The battery may be chargeable, replaceable and/or swappable, and could also be designed as a clip-in battery. The temperature regulating case may further include a battery life indicator and power on/off indicator. The case design may allow access to charging port of the electronic device and separately allow access to a charging port to charge the battery of the case. Alternatively, the electronic device may plug into an electrical connector integrated into the case to allow the electronic device to draw power from the case battery. A separate port for charging the case battery is then provided.

The temperature regulating case is a protective case design to protect the device if dropped or hit. The case is ideally designed to be able to prop up the electronic device for use, to allow attachment of the device to belts or other device for ease of carrying. The temperature regulating case allows for the camera access for scanning and touch screen access. Water and dust proof connectivity products are also recommended for use in the design.

The invention may also optionally include a probe with a temperature-sensitive head that mounts onto the back of a portable electronic device when it is engaged within the case. The temperature-sensitive probe can detect when the ambient temperature or the temperature of the portable electronic device reaches a certain predetermined level and initiate heating of the device.

In one example, the heating pad may include a thermistor that feeds a PID loop to control the power supplied to the heater to maintain a set temperature. Sensors may also be provided to monitor the ambient temperature, temperature of the circuit board, temperature of the battery and temperature of the heater. Based upon the sensed temperatures, the system can be programed to stop heating, start heating, activate preheating, or vary the power supplied to the heating element.

To help maintain the temperature within the temperature regulating case, the case may be designed from materials with known insulating properties and the various electronic components and edges of the cases may further be surrounded by material having insulating properties, such as neoprene liners or fabric sheets.

Optionally, the invention can further include a magnet mount assembly for quickly mounting and releasing the portable electronic device to various objects, including stands, clamps and/or holders (i.e., support mount) to support the portable electronic device in elevated positions at a variety of angles. The magnet mount assembly may attach to the back of the temperature control unit or to the back of the portable devices by, for example, engaging the protective perimeter casing. The mount may further include pong pins or other electrical connectors for supplying power to the temperature regulating case and/portable electronic device when the magnet mount assembly is connected to a support mount.

One example of an implementation of the temperature regulating case is illustrated in FIGS. 1-4. FIGS. 5-12 illustrate another implementation of the invention designed for use with an iPad. FIGS. 13-20 illustrate yet another implementation of the invention designed for use with an iPhone. Finally, FIG. 21 illustrates an example flow diagram illustrating the operation of the present invention to control the temperature of the case and/or electronic device.

Turning now to FIGS. 1-4, FIG. 1 is a top, perspective view of the top, right side of one example of an implementation of a temperature regulating case 100 ("case or housing") of the present invention as it appears engaged with an iPhone. In this example, the case 100 includes a bottom housing 102 and top housing 104 for receiving the electronic device 105 with the screen accessible through an opening in the top housing 104. The top and bottom housing 102, 104 are removably attached and may be held together by a friction fit, screws and nuts, snaps, hinges, or other known mechanisms (or any combination thereof) able to removably secure the top and bottom housing 104, 102 together. Here, a nut screw 108 is shown to secure the top and bottom housings 104, 102 to one another. The case 100 further includes button adapters 106 for engaging the buttons of the electronic device 105, which in this example are the volume up/down buttons on an iPhone. While not shown, an opening may also be provided for engaging the mute switch on new versions of iPhones.

Figure 2:
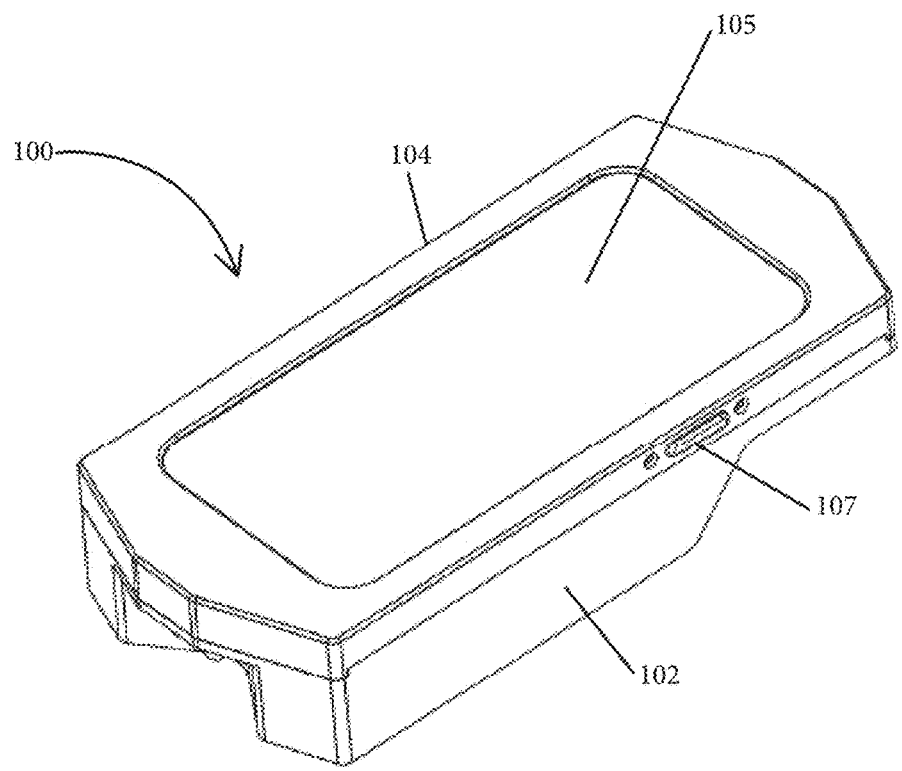
FIG. 2 is a perspective view of the top, left side of the temperature regulating case of FIG. 1.

FIG. 2 is a perspective view of the top, left side of the temperature regulating case 100 of FIG. 1. Like FIG. 1, the bottom housing 102 and top housing 104 are shown housing a portable electronic device 105. FIG. 2 illustrates a second button adapter 107 for engaging the buttons of the electronic device 105, which in this example is the on/off/lock button of on the iPhone.

Figure 3:
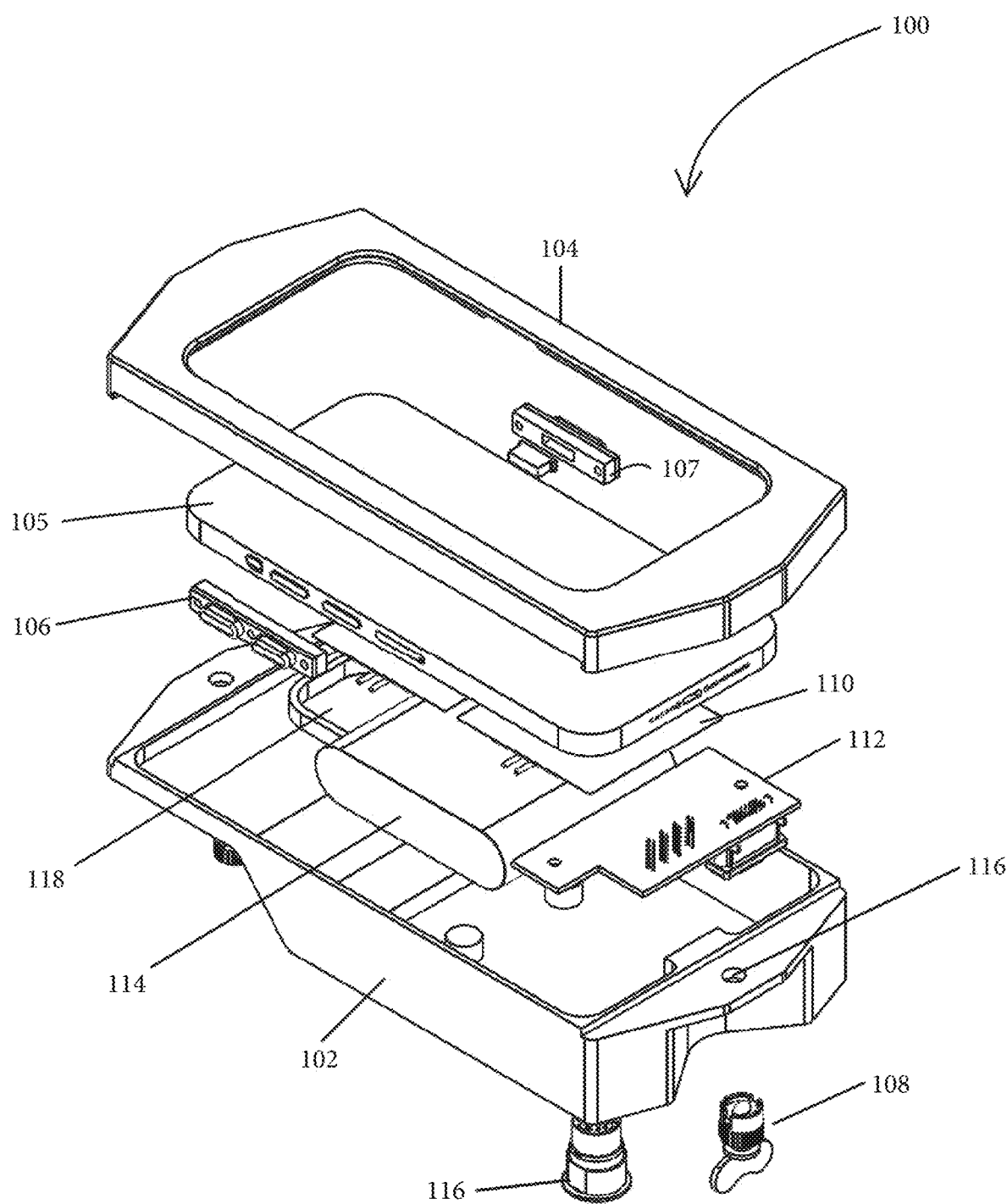
FIG. 3 is an exploded view of the temperature regulating case of FIG. 1.

FIG. 3 is an exploded view of the temperature regulating case 100 of FIG. 1. As shown in FIG. 3, the housing 100 further includes one or more heating pad(s) 110 positioned within the housing 100 directly under the electronic device 105. The bottom housing 102 includes a cavity for a circuit board 112, such as a printed circuit board ("PCB") or integrated circuit ("IC") which may include a controller, microprocessor or microcontroller. The cavity may further house at least or more batteries 114 to provide electrical power to the heating pad(s) 110 and circuit board 112. A power button/switch 116 is also provided for turning the temperature regulating case on and off. Power adapters are also provided on the case for charging the battery 114.

Figure 4:
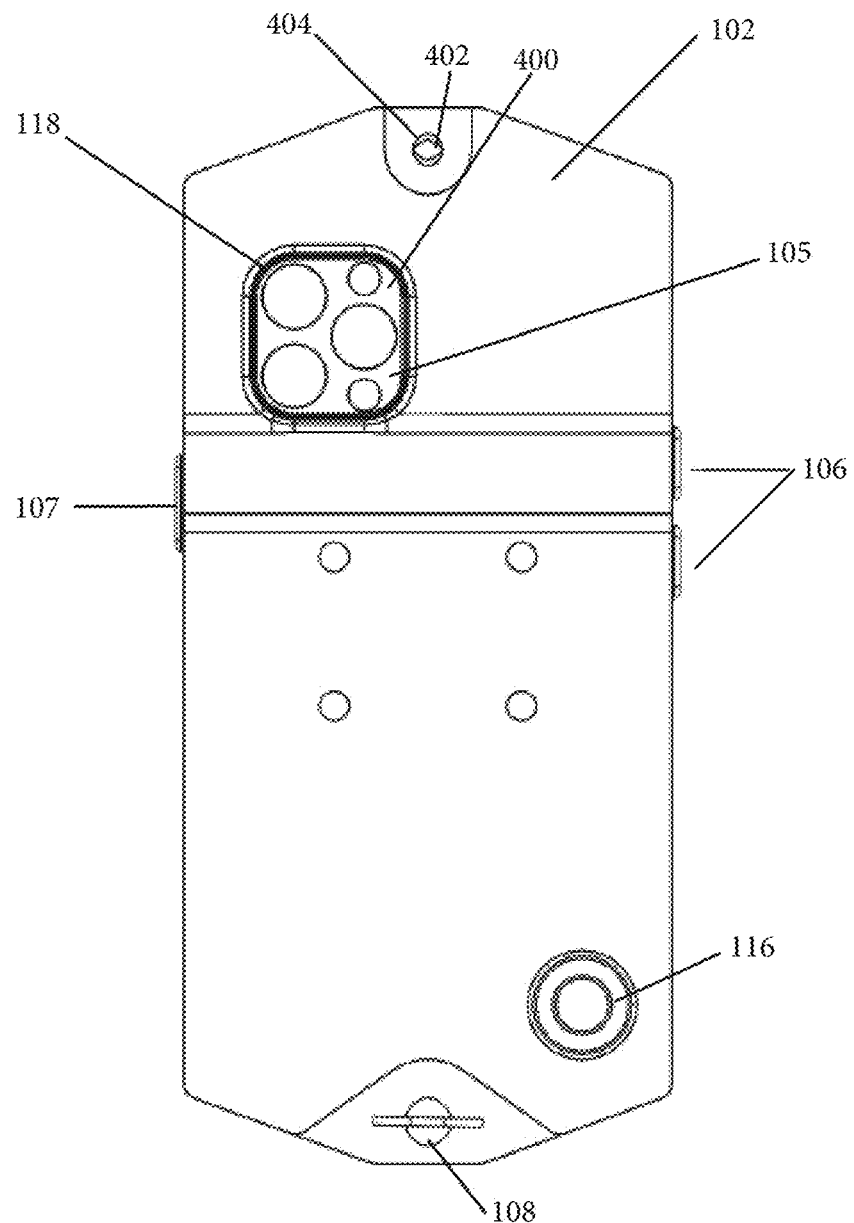
FIG. 4 is a bottom view of the temperature regulating case of FIG. 1.

The bottom housing 102 also includes a window or camera opening 118 for exposing the camera 400 on the iPhone 105 (See FIG. 4). Again, in this example, the bottom housing 104 includes a screw hole 116 for aligning with a corresponding opening in the top housing 102. Here, a wing head screw and nut 108 are provided for removably securing the top housing 104 with the bottom housing 102. Similar openings may also be included on the opposing end of the casing 100 for removably securing the opposing end with fasteners.

FIG. 4 is a bottom view of the temperature regulating case 100 of FIG. 1. As shown, the power button 116 is accessible from the bottom housing 104. Those skilled in the art will recognize that the location of the power button 116 in any drawings for any implementation provided herein is not limiting as the power button 116 could be located anywhere on the bottom housing 104. The power button 116 is in communication with the circuit board 112 to turn the regulating case 100 on and off. The first and second button adapters 106, 107 are also shown protruding from the sides of the bottom housing 104. The camera 400 of the iPhone 105 is also shown through the window or camera opening 118. Lastly, in FIG. 4, a pin or post 404 on the top housing 104 is shown extending through a top opening 404 in the bottom housing 104. In addition to the wing head screw nut 108, the post 402 extending through the top opening 404 can help align the top housing 102 with the bottom housing 104. The post 402 through the top opening 404 can create a snap or friction fit between the top housing 104 and bottom housing 102, or the post 402 could include threading and extend past the lower surface of the bottom housing 102 for engaging a male component, which could further secure the top housing 104 against the bottom housing 104.

Figure 5:
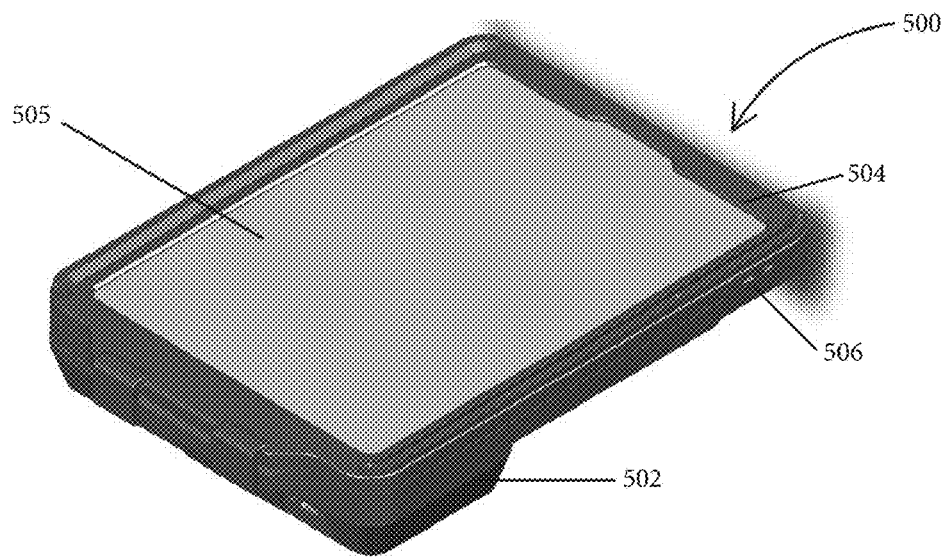
FIG. 5 is a top perspective view of one example of an implementation of a temperature regulating case of the present invention as it appears engaged with an iPad.

Turning now to FIGS. 5-12, which illustrate another implementation of the invention designed for use with an iPad. FIG. 5 is a top perspective view of a temperature regulating case 500 as it appears engaged with an iPad 505. Similar to the temperature regulating case 100 for use with an iPhone 105, the case 500 includes a bottom housing 502 and top housing 504 for receiving the electronic device 505, which in this example is a tablet, such as an iPad, with the screen accessible through an opening in the top housing 504. The case 500 further includes button adapters 506 for engaging the volume buttons of the electronic device 505.

Figure 6:
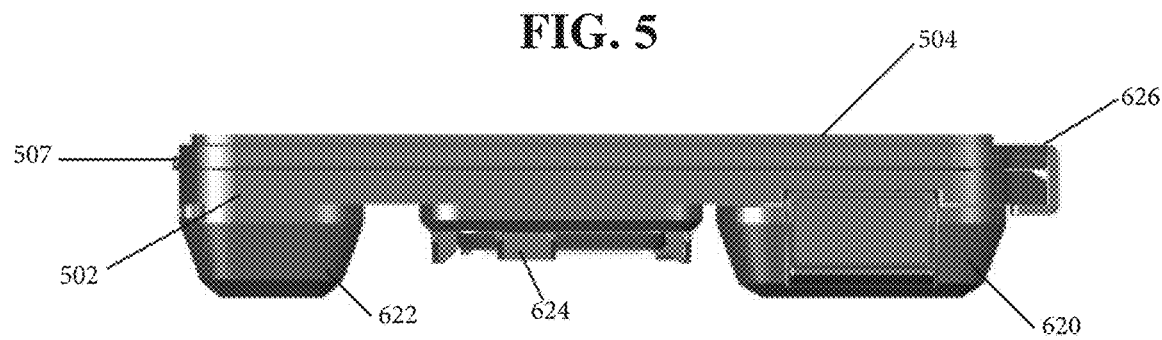
FIG. 6 is a side view of the right side of the temperature regulating case of FIG. 5.
Figure 9:
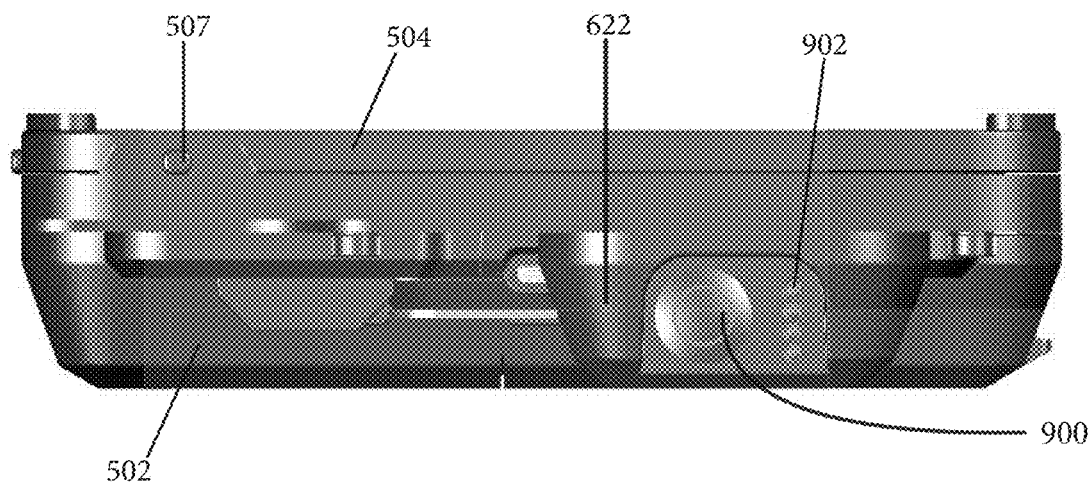
FIG. 9 is a front view of the temperature regulating case of FIG. 5.

FIG. 6 is a side view of the right side of the temperature regulating case of FIG. 5. The bottom housing 502 includes a battery compartment 620 and a power compartment 622 for housing a power switch 1206 (FIG. 12) and optional power indicator lights 902 (FIG. 9). Also shown is an optional mount 624, which may be removably affixed to the exterior surface of the bottom housing 502 and may provide independent power and data to the temperature regulating case and/or electronic device. Second button adapter 507 is also show for engaging the on/off/lock button on the iPad 505. Like with the temperature regulating case 100 in FIG. 1-4, the top and bottom housing 504, 502 are removably attached and may be held together by a friction fit, screws and nuts, hinges, snaps, or other known mechanism for removably securing the top and bottom housing 502, 504 together. Here, a clasp 626 is provided for aligning and securing the top and bottom housings 102, 104 to one another.

Figure 7:
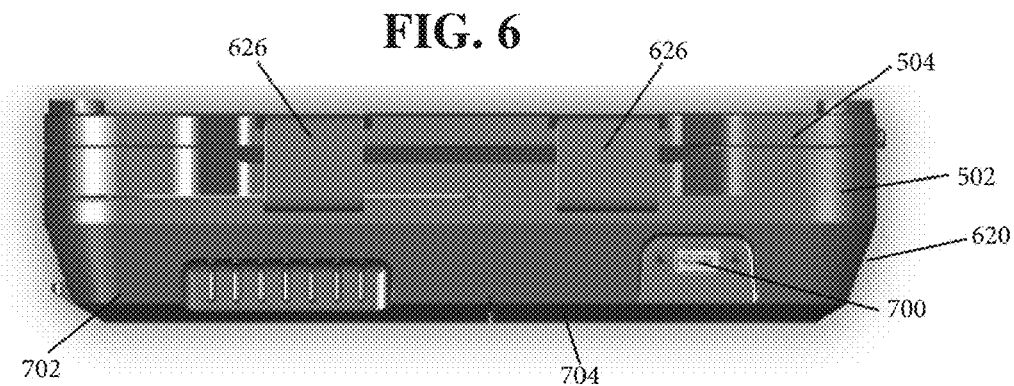
FIG. 7 is a rear view of the temperature regulating case of FIG. 5.

FIG. 7 is a rear view of the temperature regulating case 500 of FIG. 5. The clasps 626 are shown on the rear of the case 500 for engaging the top and bottom housing 504, 502. A power adaptor 700 is also shown for powering a battery in the battery compartment 620. As shown in FIG. 7 and also as illustrated further in connection with FIG. 12 below, the battery compartment in this example is two separate pieces: a battery 702 and an electrical compartment 704.

Figure 8:
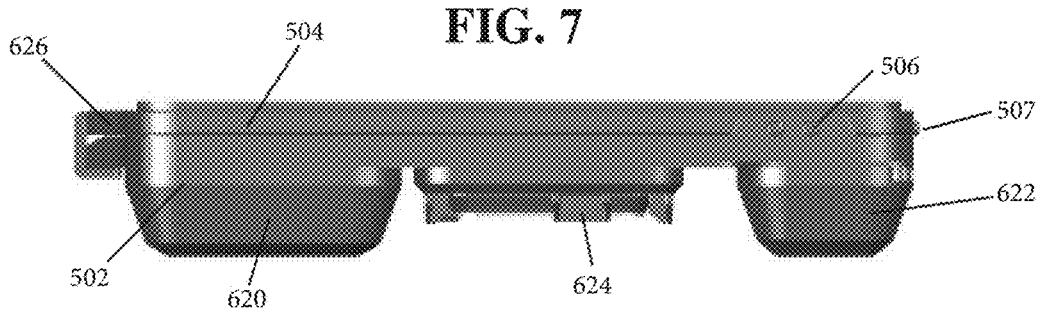
FIG. 8 is a side view of the left side of the temperature regulating case of FIG. 5.

FIG. 8 is a side view of the left side of the temperature regulating case 500 of FIG. 5, which also shows the top and bottom housing 504, 502, the battery compartment 620, power compartment 622 and clasp 626. Here, both the first button adapters 506 for the volume buttons on the iPad and the second button adapters 507 for the on/off/lock switch 507 are shown.

FIG. 9 is a front view of the temperature regulating case 500 of FIG. 5. Here, the power switch 900 and optional indicator lights 902 are shown on the power compartment 622. The second button adapter 507 for the on/off/lock switch is also shown.

Figure 10:
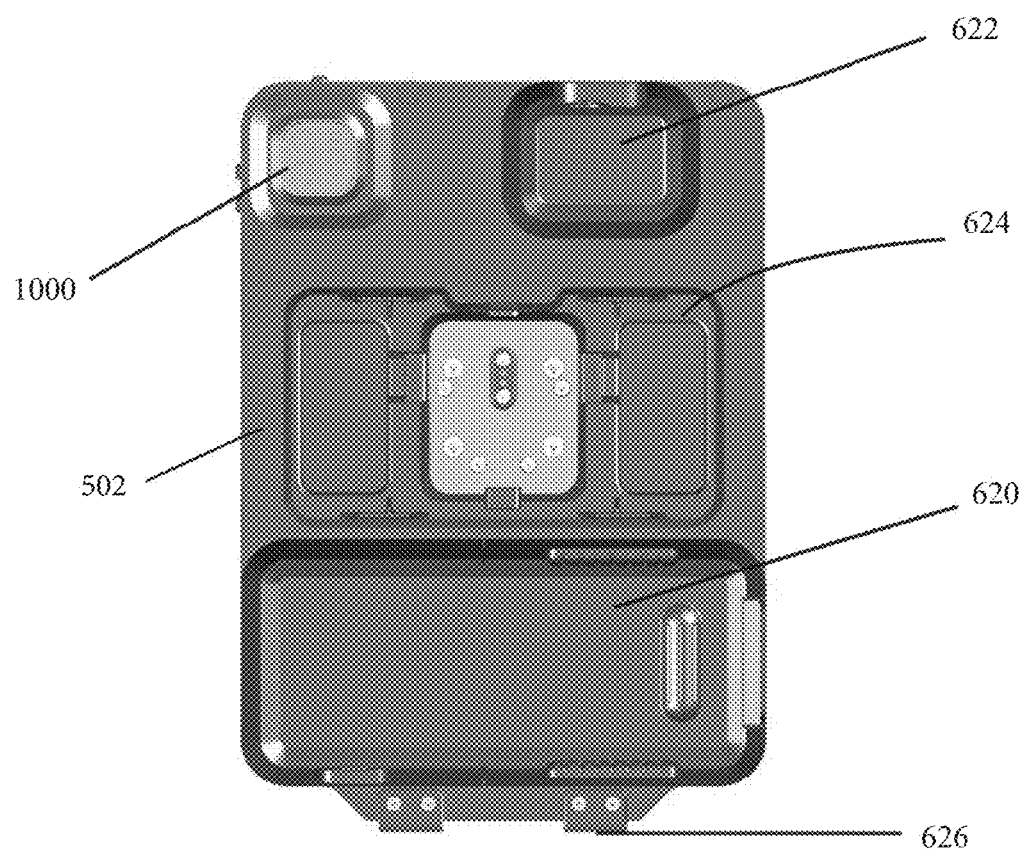
FIG. 10 is a bottom view of the temperature regulating case of FIG. 5.

FIG. 10 is a bottom view of the temperature regulating case 500 of FIG. 5. The window or camera opening 1000 can be seen on the bottom housing 502 to expose the camera of the electronic device 505. The mount 624, which may be removably affixed to the lower surface of the bottom housing 502, is affixed to the bottom housing 502. The battery compartment 620, power compartment 622 and clasps 626 are also shown in FIG. 10.

Figure 11:
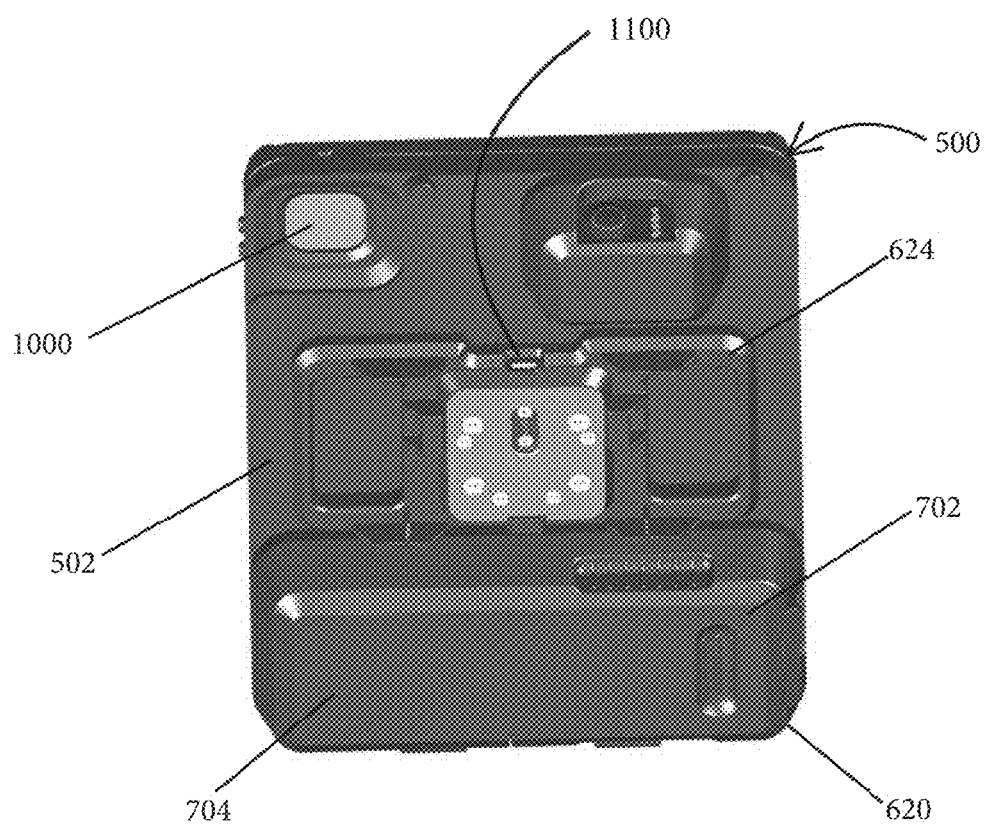
FIG. 11 is a bottom perspective view of the temperature regulating case of FIG. 5.

FIG. 11 is a bottom perspective view of the temperature regulating case 500 of FIG. 5. The mount 624 may include electrical components and/or data connections 1100 for supplying power to the iPad or case 500 and/or sending and receiving data to and from the iPad 505 or case 500.

Figure 12:
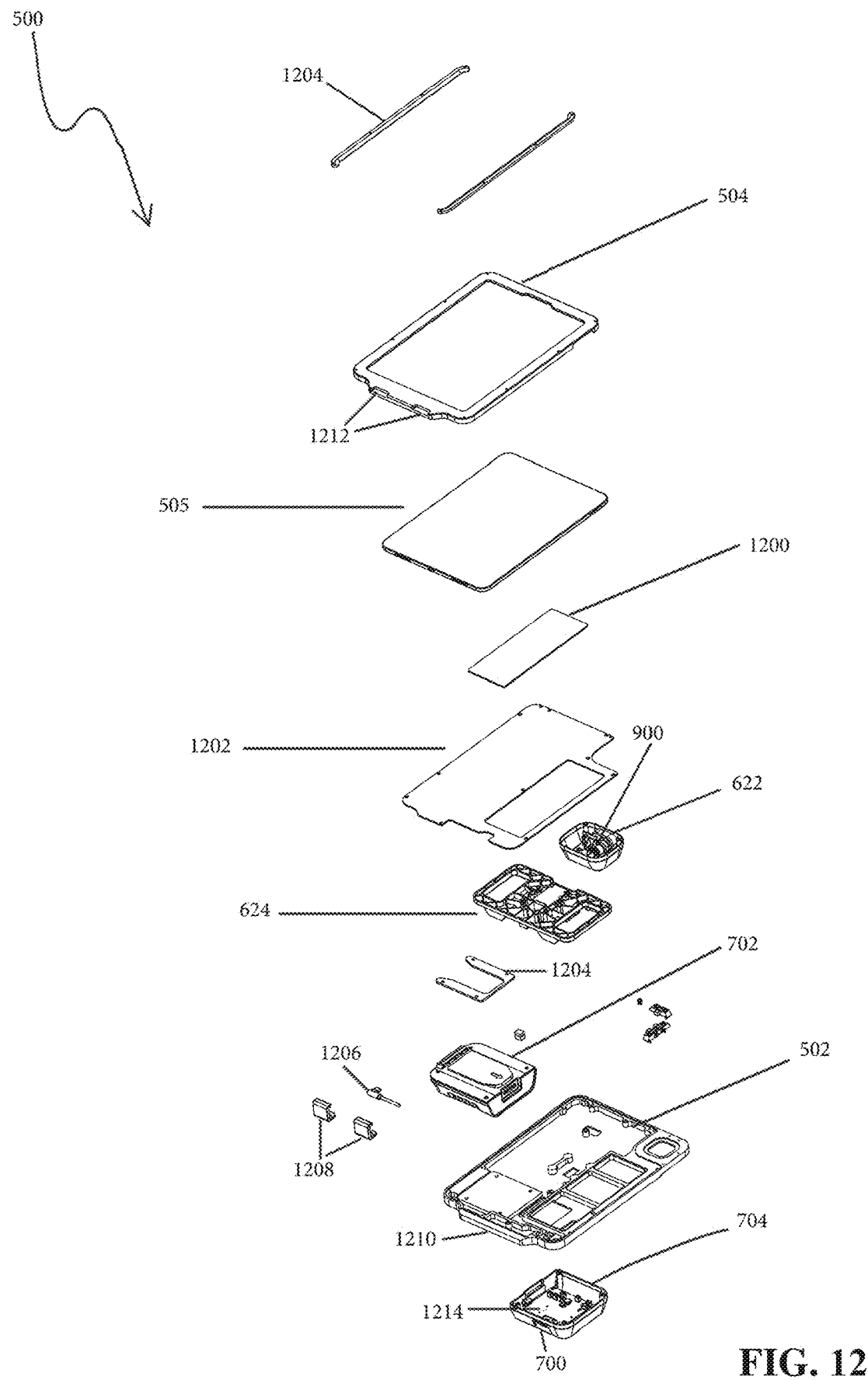
FIG. 12 is a top perspective exploded view of the temperature regulating case of FIG. 5.

FIG. 12 is a top perspective exploded view of the temperature regulating case 500 of FIG. 5. As shown best in FIG. 12, the case 500 further includes a heating pad 1200 positioned within the case 500 directly under the electronic device 505. A support plate 505 is also provided in the bottom housing 502 to support the iPad in the case 500. The support plate 505 includes an opening for the heating plate 510 to extend through to contact the bottom of the electronic device 505.

Attached to the underside of the bottom housing 502 is a battery pack and/or battery compartment 702 containing at least one battery or batteries. The battery pack 702 is in communication with an electrical compartment for 704 housing a circuit board having a controller or microcontroller 1214. Attached to the underside of the bottom housing is a support bracket 1204 for engaging with the battery pack 702 so that it can be separately removed and recharged. Together, the battery pack and electronic compartment comprise the battery compartment 620. Also attached to the underside of the bottom housing 502 is a power compartment 622 that is in communication with the circuit board 1214. The power compartment 622 includes a power switch 900 for turning the temperature regulating case on and off and power/charge indicator lights 902.

The at least one battery 702 provides power to the circuit board 1214 which is in communication with the heating pad 1200 and which also controls the power supplied to the heating pad 1200. Power adapters 700 are also provided to charge the battery 702 and/or electronic device 505. Optionally, a USB-C cord 1206 (or similar power cord) is provided that is in communication with the battery 702. The cord 1206 can be electrically connected to the charge port of the iPad so that the battery 702 can charge the iPad and provide power to operate the temperature regulating case 500.

In the illustrated example, the top and bottom housing 504, 502 are removably attached and are held together in this example by a clamp mechanism 626. In this example, the clamp mechanism 626 includes two or more U-shaped clips 1208. The clips 1208 engage both a lip 1210 on the bottom housing 502 and indentions 1212 on the top housing 504. The clips 1208 can be secured on either the top housing 504 or the bottom housing 502 to allow the top and bottom housing 504, 502 to be separated for the insertion of the iPad into the temperature regulating case 1300. Like with other examples, the top and bottom housing 504, 502 are removably attached and held together by a friction fit, screws and nuts, hinges, snaps, or other known mechanisms for removably securing the top and bottom housing together. Although not shown, the front edge of the top and bottom housing 504, 502 opposite the clips 1208 can be fastened together by any of the foregoing fasteners, including by, for example, wing nuts and screws.

Figure 13:
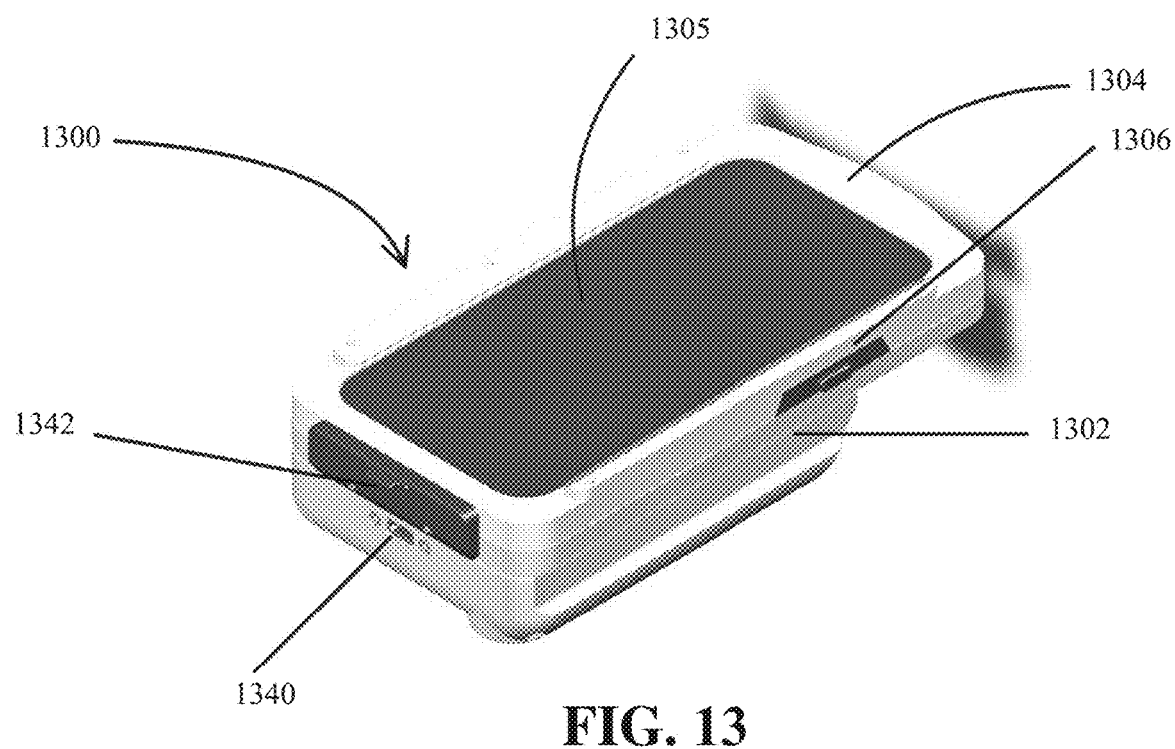
FIG. 13 is a top perspective view of one example of an implementation of a temperature regulating case of the present invention as it appears engaged with an iPhone.

FIGS. 13-20 illustrate yet another implementation of a temperature regulating case 1300 designed for use with an iPhone. In particular, FIG. 13 is a top perspective view of the temperature regulating case 1300 as it appears engaged with an iPhone. Like the example in FIGS. 1-4, the case 1300 includes a bottom housing 1302 and top housing 1304 for receiving the electronic device 1305 with the screen accessible through an opening in the top housing 1304. The housing 1300 further includes first button adapters 1306 for engaging the buttons of the electronic device 1305. A separate port opening 1342 on the top housing 1304 may be included for accessing the charging port of the electronic device 1305. A charging port 1340 for charging the battery 1314 (FIG. 20) of the temperature regulating case 1300 may be positioned on the bottom housing 1302.

Figure 14:
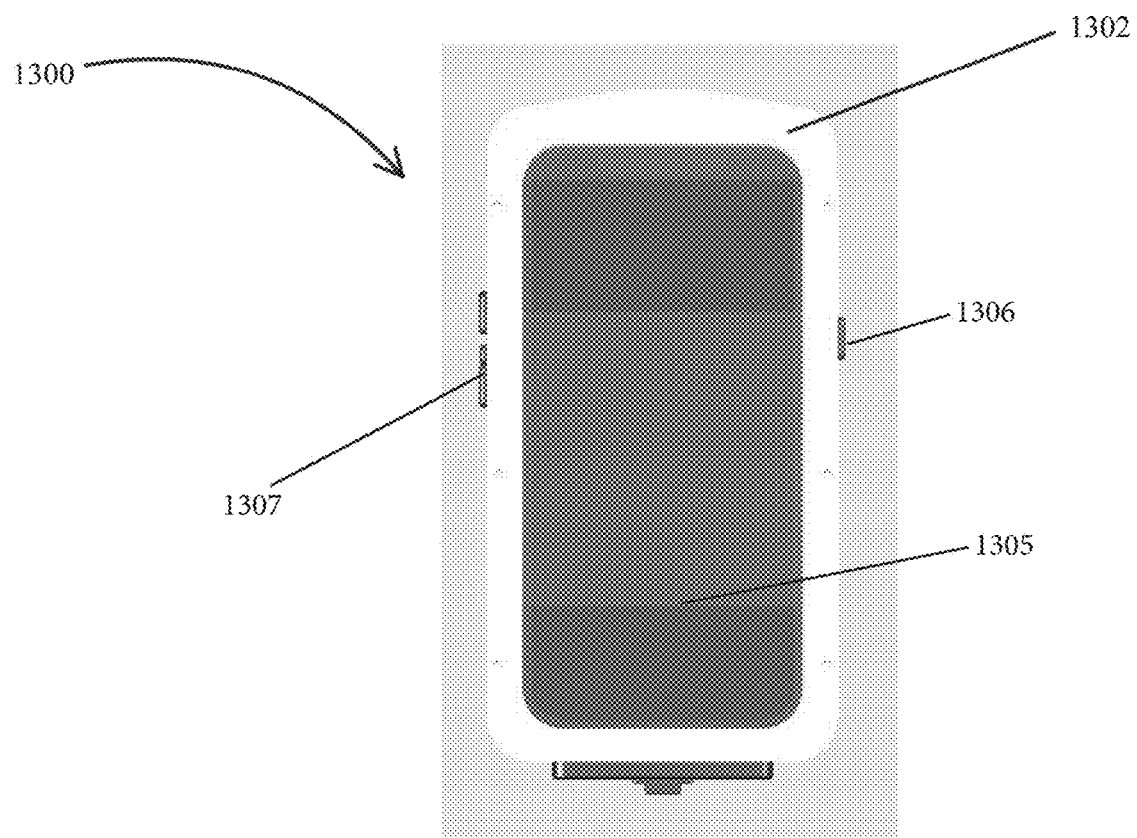
FIG. 14 is a top view of the temperature regulating case of FIG. 13.

FIG. 14 is a top view of the temperature regulating case 1300 of FIG. 13. As illustrated, the screen of the electronic device 105 can be accessed through the opening in the top housing 1304. A first button adapter 1306 is provided for the on/off/lock key of the iPhone. A second set of button adapters 1307 is provided for the volume keys of the iPhone. For newer iPhone, an opening may also be provided for the silence switch, or the silence switch may be covered requiring user to silence the phone prior to inserting it into the temperature regulating case.

Figure 15:
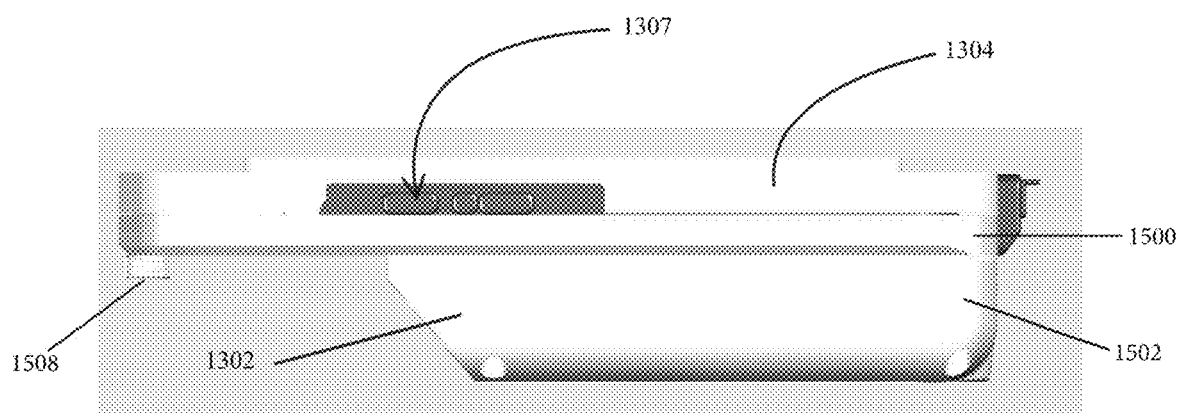
FIG. 15 is a side view of the right side of the temperature regulating case of FIG. 13.

FIG. 15 is a side view of the right side of the temperature regulating case of FIG. 13. The top housing 1304 includes second button adapters 1307. Here, the bottom housing 1302 is made of two parts, a base 1500 and electrical compartment 1502, that can be fastened together or optionally, molded to be one piece.

Figure 16:
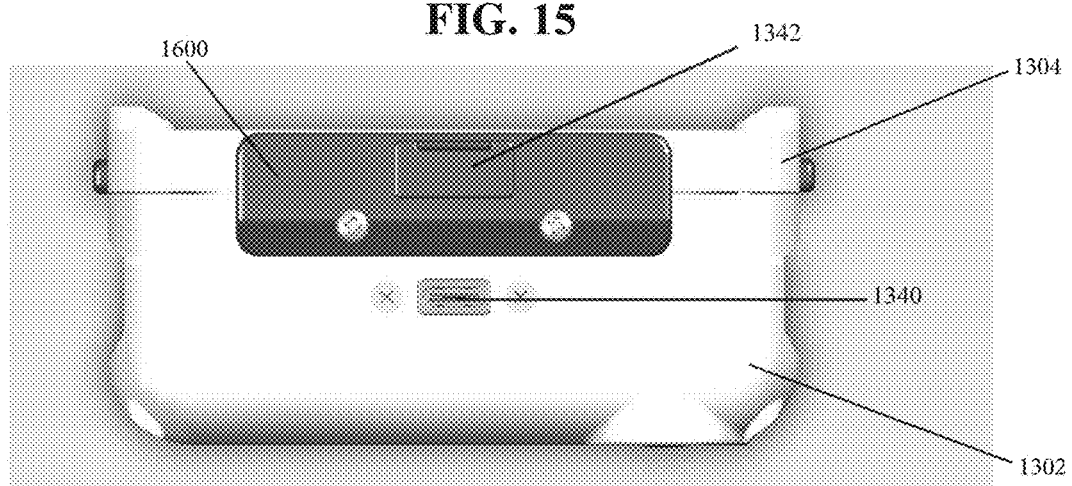
FIG. 16 is a rear view of the temperature regulating case of FIG. 13.

FIG. 16 is a rear view of the temperature regulating case of FIG. 13. The rear of the bottom housing includes an electrical adapter in communication with at least one battery 1314 (FIG. 20) housed in the electrical compartment 1502 for charging the at least one battery 1314. A connection plate 1600 is connected to the base 1500 that extends upward adjacent with the rear side of the top housing 1304. The connection plate 1600 includes an opening 1342 (that may include a cover) for accessing the charge port of the electronic device. The top housing 1304 includes a port opening that aligns with the connection plate opening 1342, also for allowing access to the charge port of the electronic device.

Figure 17:
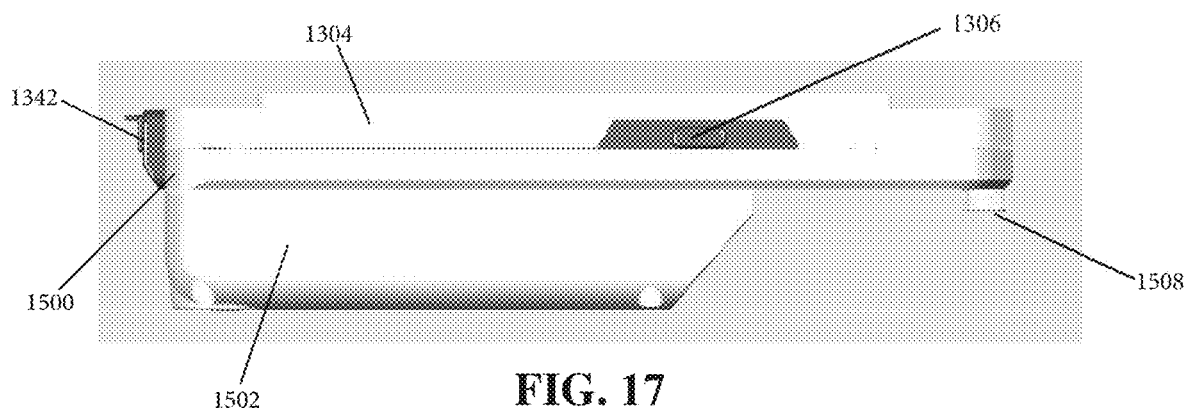
FIG. 17 is a side view of the left side of the temperature regulating case of FIG. 13.

FIG. 17 is a side view of the left side of the temperature regulating case of FIG. 13. Like FIG. 15, the top housing 1304 includes first button adapters 1306 for engaging the on/off/lock button on the electronic device. Both parts of the bottom housing 1302: the base 1500 and electrical compartment 1502 are also shown. The top housing 1304 and base 1500 of the bottom housing 1302 are fastened together with a fastener 1508.

Figure 18:
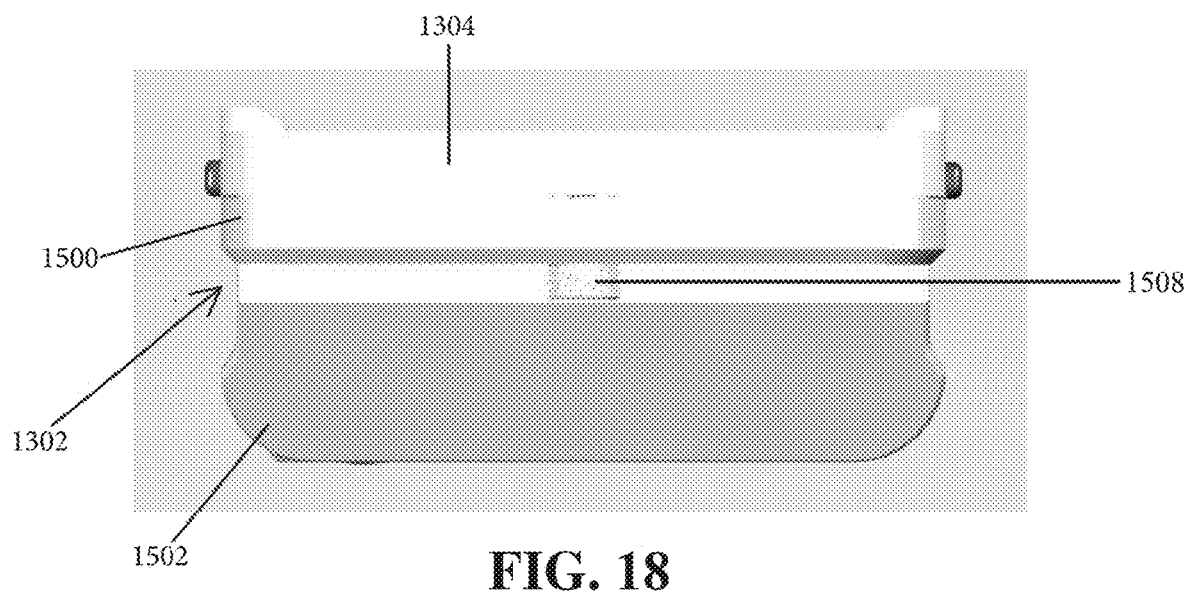
FIG. 18 is a front view of the temperature regulating case of FIG. 13.

FIG. 18 is a front view of the temperature regulating case of FIG. 13. Like with other provided examples, the top and bottom housing 1304, 1302 are removably attached and held together by a friction fit, screws and nuts, hinges, snaps, or other known mechanism for removably securing the top and bottom housing together. Here top and bottom housings

1304, 1302 may be fastened together by a screw fastener 1508, 1800. Holes in the top housing 1304 may align with a hole in the base 1500 of the bottom housing 1302 for receiving a fastener 1508.

Figure 19:
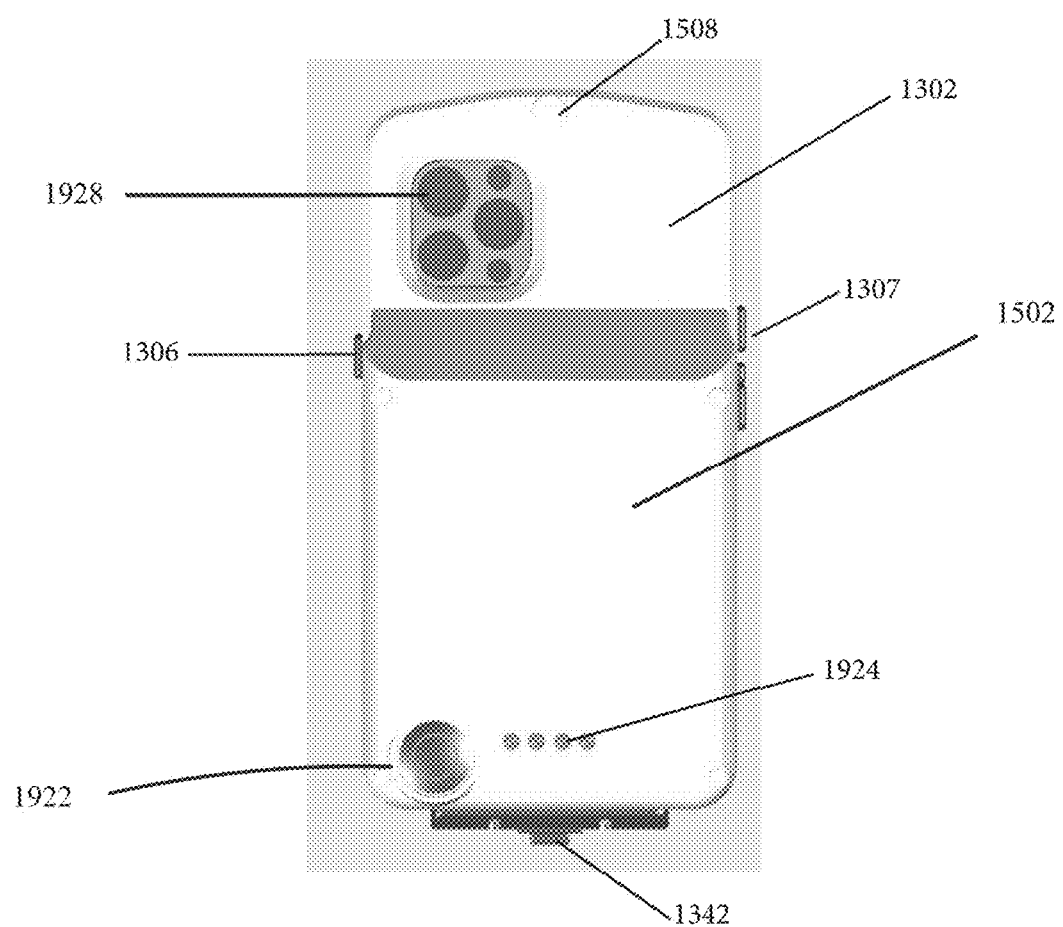
FIG. 19 is a bottom view of the temperature regulating case of FIG. 13.

FIG. 19 is a bottom view of the temperature regulating case of FIG. 13. The electronic compartment 1502 of the bottom housing 1302 includes a power switch 1922 and power or charge indicator lights 1924. The base 1500 of the bottom housing includes a camera opening or window 1928 for the camera of electronic device 1305. First and second button adapters 1306 and 1307 are also present on the sides of the temperature regulating case 1300 along with the fastener 1508.

Figure 20:
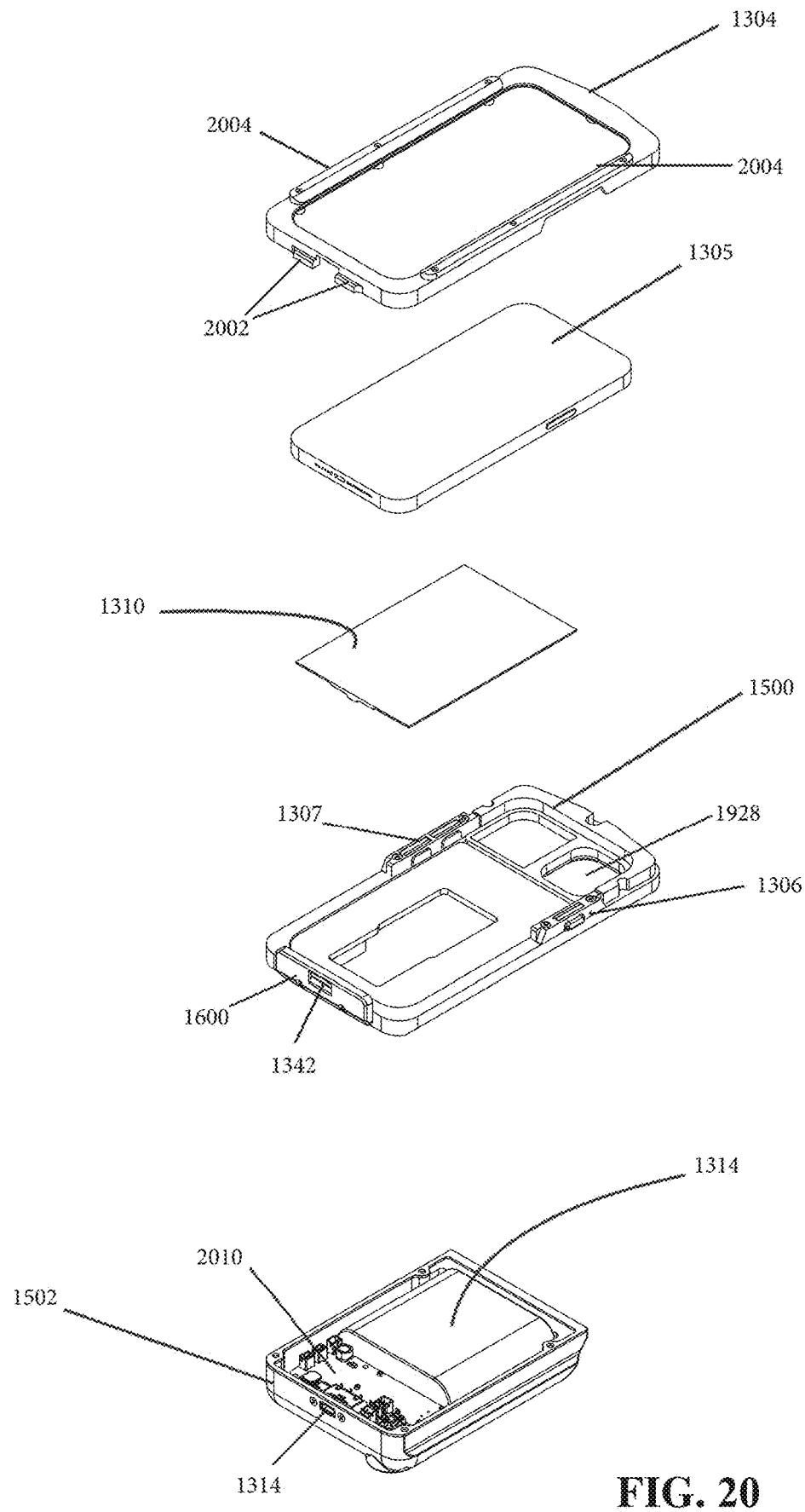
FIG. 20 is an exploded view of the temperature regulating case of FIG. 13.
Figure 21:
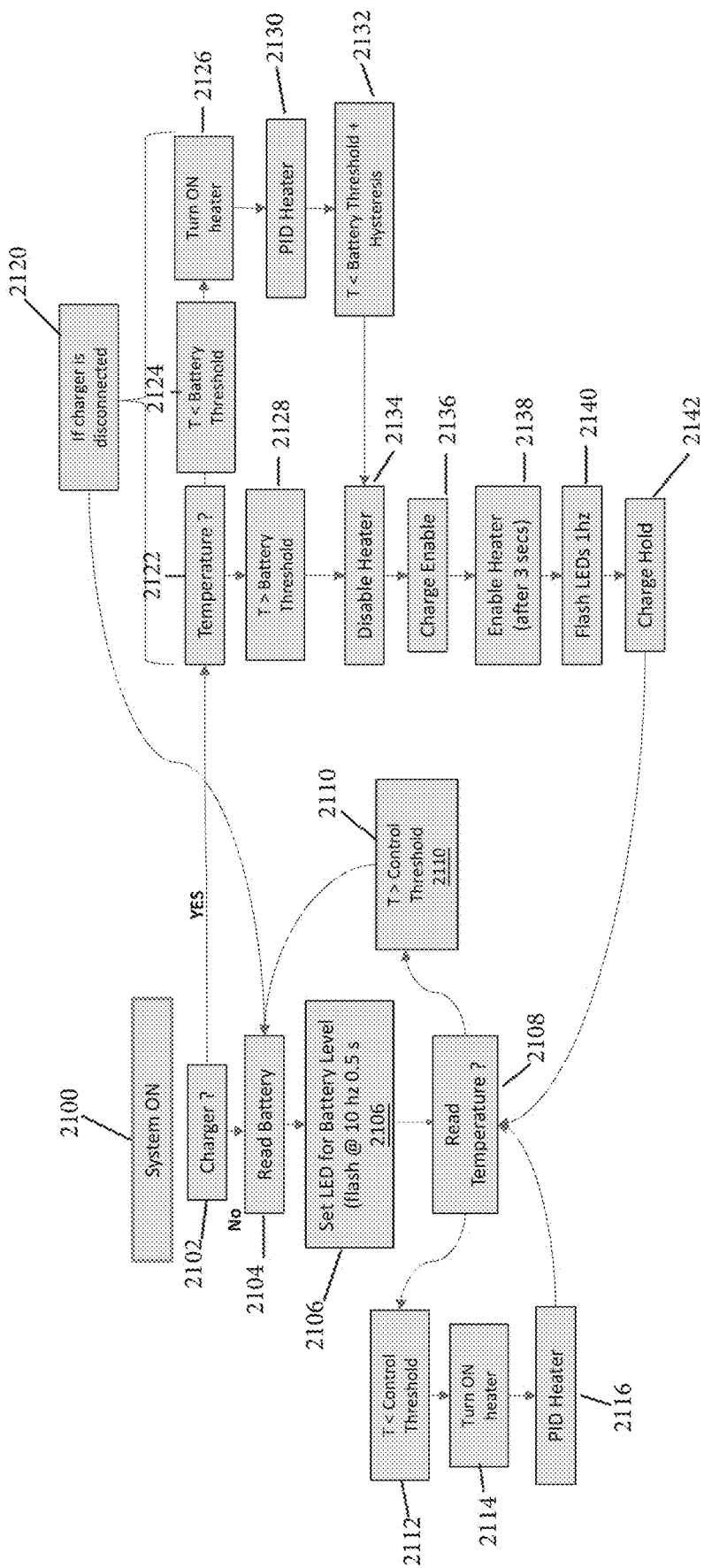
FIG. 21 is a flow diagram describing one example method for controlling the operation of the temperature regulating case of the present invention.

FIG. 20 is an exploded view of the temperature regulating case 1300 of FIG. 13. The case includes a top housing 1304 with two protective rails 2004 mounted thereon and a bottom housing 1302 including a base 1500 and an electrical compartment 1502. Positioned within the base 1500 directly underneath the electronic device 1305 is a heating element or pad 1310. Positioned within the electrical compartment 1502 is a battery 1314, circuit board 2010, a power switch 1922 and LEDs for the power indicator lights 1924. The circuit board 2010 is in communication with the battery 1314, the heating element 1310, the power switch 1922 and the power indicator lights 1924. The battery 1314 provides power to the circuit board 2010 which controls and powers the heating element 1310. The battery 1314 may be positioned in the electrical compartment 1502 and may be charged through charging port 1340.

The base 1500 of the bottom housing 1302 includes first and second button adapters 1306, 1307 and a camera opening or window 1928 for the camera of the electrical device 1305. In the illustrated example, the top and bottom housing 102, 104 are removably attached and may be held together by a screw 1508, as described previously. To assist in this connection, connection plate 1600 is attached to the rear end of the base 1500 and extends upward so that when connected to the top housing 1304 the connection plate 1600 will also be adjacent with the rear side of the top housing 1304. The connection plate 1600 includes a device charge opening 1342 for accessing the charge port of the electronic device 1305. The top housing 1304 includes a port opening that aligns with the connection plate opening 1342 also for allowing access to the charge port of the electronic device 1305. The top housing also includes ribs 2002 positioned on each side of the port opening that fit in corresponding grooves on the back side of the connection plate 1600 to align the top housing 1304 with the base 1500 of the bottom housing 1304 to interconnect the two components (the top housing 1304 and base 1500).

In all examples, the top housing 104, 504 and 1304 include an opening for accessing the screen of the electronic device. The opening of the top housings 104, 504 and 1304 is slightly smaller than the outer edges of the electronic device to allow the top housing 104, 504 and 1304 to engage the electronic device where the screen is fully accessible by the user yet will not shift or fall from the opening of the case. Further, in all cases, the battery may be one or more batteries that may be rechargeable or replaceable.

Further, in all examples, temperature sensors, such as thermistors or other type of temperature sensors are used to monitor the temperature of the electronic device and, in some examples, the ambient temperature. Sensors may also be used in connection with a PID temperature controller.

In all cases, the heating element is positioned directly behind the electronic device. While the heating element may make direct contact with the back of the electronic device, the heating element could also be positioned behind a contact plate or other thermal conductive material. In one example, the thermal conductive material may be larger than the heating element and may help distribute the heat across a large surface area to heat the electronic device.

A heat sink and/or fan may also optionally be included within the housing of the temperature regulating case to prevent the electrical components from overheating, as needed. Further, if a Peltier plate is used as the heating element, the temperature regulating case of the present invention could also be designed to cool the electronic device. Whether to operate in heating or cooling mode could be user selected or automatically determined by using a temperature sensor, such as a thermistor.

In operation, different optional features may be provided through the use of the temperature regulating of the present invention. Below is a table describing example operational features, as used with an iPhone. The below can also be adapted for use with an iPad or other electronic device.

|  | Category | Description |
| --- | --- | --- |
| User Needs | General use | The device fits an iPhone 12pro max. |
|  | General use | The device could be adapted to fit other iPhones. |
|  | Operation | The device operates in −18° C. environments. |
|  | Operation | The device is able to operate simultaneously while transitioning from warm to cold environments. |
|  | Operation | The device could operate in −40° C. environments. |
|  | User Interaction | The device is able to be powered off and on by the user. |
|  | User Interaction | The device indicates to the user that it is powered on. |
|  | User Interaction | Users can check the device's battery life status at any time. |
|  | User Interaction | Users can take the phone in and out of the phone case. |
|  | User Interaction | The device does not obstruct the user's access to the touchscreen in any way. |
|  | Battery | The device can run for 4 hours before the batteries need charging. |
|  | Battery | The device can completely recharge (from 0% battery life) in 5 hours. |
|  | Battery | The device can ran for 12 hours before the batteries need charging. |

| Category | Description |
| --- | --- |
| Design Inputs | |
| Transportation | The user can mount the device onto their belt. |
| Transportation | The user can mount the device onto their forearm with and without a jacket. |
| Transportation | The user can mount the device onto a vehicle or forklift. |
| Enclosure | The housing includes an AMPS mount (30 mm × 38 mm hole pattern). |
| Enclosure | The housing can be CNC'd without contour milling. |
| Enclosure | The ports could all be located on the bottom surface to reduce CNC labor. |
| Enclosure | The enclosure could be secured with thumb screws. |
| Enclosure | The device should use insulating foam to help maintain/regulate the phone's temperature. |
| Enclosure | Smaller components may be designed for 3D printing or CNC as the manufacturing method. |
| Power | The device has a power button. |
| Power | The device has an LED that illuminates to indicate when the device is powered on. |
| Power | The power button is board mounted. |
| Power | The device has a USB-C female connector that is accessible to the user from the outside of the case. |
| Battery | The device can use 18650 rechargeable batteries. |
| Heater | The device has an ambient probe. The device has an external probe on the back of the phone. |
| Access | The device does not obstruct the iPhone's camera function. |
| Access | The device complies with Apple MyFi requirements. |
| Access | The device allows access to the iPhone/iPad side buttons. |
| Access | The device could allow the user to charge the iPhone/iPad while inside of the enclosure. |
| Ingress Protection | The device should be IP54 rated. |
| Accessories | Accessories can be purchased or fabricated in the USA. |
| Accessories | The device should have a clip or other means to attach to the user's belt/forearm. |
| Accessories | The device should allow for a RAM ball attachment. |
| Durability | The device should pass the drop test specified in mil-spec 810G (48"). |

FIG. 21 is a flow diagram illustrating an example operation of the present invention to control the temperature of the case and/or electronic device. First, the user of the case checks to determine if the system is on 2100. The system then checks to determine if the temperature regulating case is connected to a power supply or charger 2102. If powered by battery, the battery level is first read 2104, and the power indicator lights are set to flash at a certain battery level 2106. The internal temperature of the temperature regulating case is then checked 2108, which may be checked at an area near the back of the electronic device. The measured temperature is then compared to a control temperature 2116. If the temperature is above the control temperature 2110, the system continues to check the battery and temperature until further action is required. If the temperature is below a control temperature, then the heating element is engaged 2114 and controlled using, for example, a PID temperature controller 2116. The temperature of the regulating case and electronic device is checked 2018 and the heating element continues to be engaged or disengaged based upon whether the temperature readings are above or below the control temperature.

If the charger is connected, the temperature of the battery must also be maintained. The temperature of the temperature regulating case is then checked 2122. The measured temperature is then compared to a battery threshold temperature. If the temperature is above the battery threshold temperature 2128, the system will not engage or will disable the heater 2134 if engaged. If the temperature is below the battery threshold temperature, then the heating element is engaged 2126 and again controlled, for example, by PID temperature controller 2130. The temperature of the regulating case and/or electronic device is checked 2132, which may account for hysteresis 2132 when determining if the temperature readings are above or below the battery threshold temperature. Once the temperature is above the battery threshold temperature, the heater is disabled 2136. Charging of the battery is enabled 2136. The heater is then reengaged after a short period of time 2138 (for example 3 secs). Once the battery is charged to a predetermined level, the power indication display is engaged 2140 and charging is placed on hold 2124. With the battery charged, the temperature is then read 2108 and the heater is controlled by the control temperature 2110, 2112. If the charger becomes disconnected 2120, then temperature regulating case reverts to operating as if powered only by battery at step 2104.

In the above operating examples, the temperature that is checked, especially when heating the case for the battery, may be the ambient temperature rather than the temperature of the regulating case/electronic device. As set forth above, other sensors may also be included for checking the temperature of other components and the heating element may be activated in response to those temperatures as well.

Other devices, apparatus, systems, methods, features and advantages of the invention will be or will become apparent to one with skill in the art upon examination of the following figures and detailed description. It is intended that all such additional systems, methods, features and advantages be included within this description and be within the scope of the invention.

Other features may also be optionally implemented into the temperature regulating case described herein, without departing from the scope of the invention. For example, other heating elements, such as air heaters, may be used in addition to or in lieu of heating pads or heating plates. Depending upon the type of heating unit, contact may be desired between the electronic device and the heating unit, or contact may need to be avoided. Further, cooling elements may also be provided to provide both heating and cooling effects on the electronic device. Optionally, the temperature regulating case may include WiFi access, Bluetooth and other hardware and software to facilitate communications between the temperature regulating case and the portable electronic devices and an internal or external network Bluetooth, WiFi, radio and or other wired or wireless communications may be established between the portable electronic devices and temperature regulating case to increase functionality by placing the temperature regulating case in signal communication with the portable electronic devices. For example, speakers or other accessories may be included in the temperature regulating case that are accessible through communication between the portable electronic devices and temperature regulating case mounts.

It will be understood that the component parts of the system taught herein may further be in signal communication with one another. The term "in signal communication" as used herein means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

More generally, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components. For purposes of this application, the hardware and/or software necessary to establish signal communication between two components shall be "communications components."

The foregoing description of an implementation has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A temperature regulating case for engaging a portable electronic device having a front and a back, the temperature regulating case comprising:
    a housing for engaging a portable electronic device, the housing having insulating foam for maintaining the internal temperature of the housing and a first temperature sensor located on the housing for monitoring the ambient air temperature outside of the temperature regulating case;
    the housing having a top housing and a bottom housing, wherein the bottom housing comprises:
        a base for supporting at least one heating element and a second sensor, where both the at least one heating element and base are positioned in the base of the housing and aligned with the back of the portable electronic device for heating the electronic device when used in cool temperatures and monitoring the internal temperature of the temperature regulating case; and
        an electrical compartment positioned below the base separated from the at least one heating element, the electrical compartment having at least one battery, a power switch and an integrated circuit having a controller, where the controller is in communication with both the first temperature sensor, the second temperature sensor, the battery and the power switch, and where the controller controls the operation of the at least one heating element based upon a comparison of ambient air temperature and the temperature of the regulating case based upon temperature information received from the first and second temperature sensors.

2. The temperature regulating case of claim 1 where the at least one heating element is a flexible heating pad.

3. The temperature regulating case of claim 1 where the at least one heating element is a Peltier plate.

4. The temperature regulating case of claim 1 where the at least one heating element is in direct contact with a surface of the portable electronic device.

5. The temperature regulating case of claim 1 where the housing further includes a thermal contact plate comprised of thermal conductive material for contacting the back of the electronic device, where the heating element is positioned behind the thermal contact plate.

6. The temperature regulating case of claim 1 further including a PID temperature controller in communication with both the first and second temperature sensors.

7. The temperature regulating case of claim 1 where the at least one battery is a rechargeable battery.

8. The temperature regulating case of claim 7 where, when the rechargeable battery is being charged, the controller controls the operation of the at least one heating element based upon a comparison of the internal temperature of the regulating case to that of a threshold battery temperature.

9. The temperature regulating case of claim 1 where the at least one battery is a removable rechargeable and swapable battery pack positioned on the bottom housing in communication with the controller for powering the temperature regulating case.

10. The temperature regulating case of claim 1 further including an electrical cable in the bottom housing in communication with both the controller and the at least one battery for connecting to a charge adapter of the portable electronic device to charge the portable electronic device while in the temperature regulating case.

* * * * *